Oct. 8, 1929.  F. E. FOWLER  1,731,129
MIXING MACHINE
Filed Feb. 4, 1929   3 Sheets-Sheet 1

Frank E. Fowler
INVENTOR

BY *Victor J. Evans*
ATTORNEY

WITNESS

Oct. 8, 1929.  F. E. FOWLER  1,731,129
MIXING MACHINE
Filed Feb. 4, 1929  3 Sheets-Sheet 2
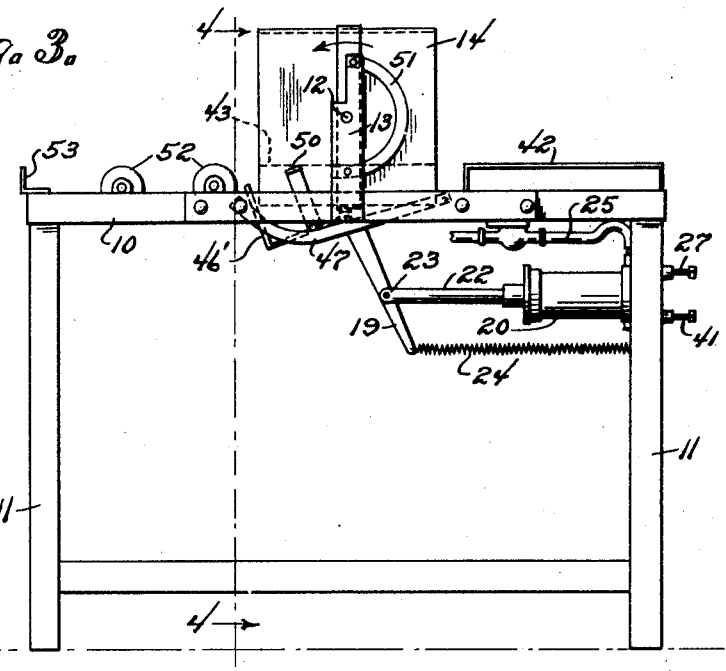
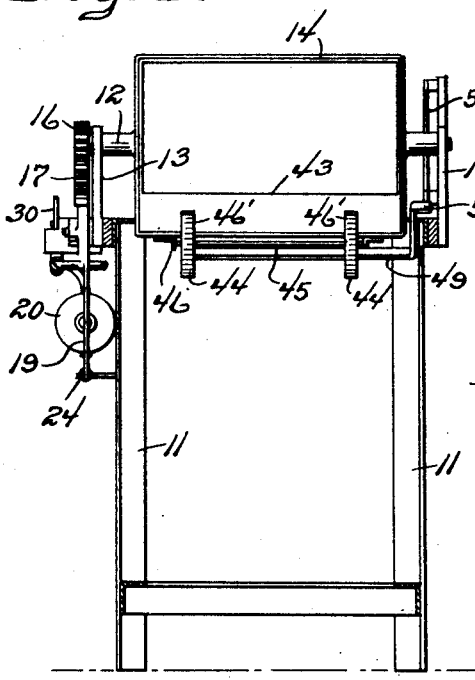
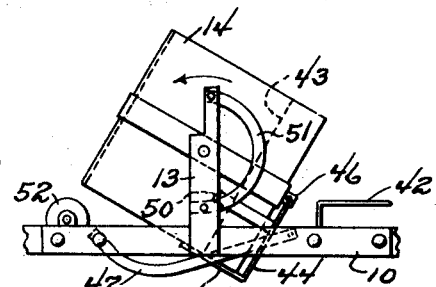
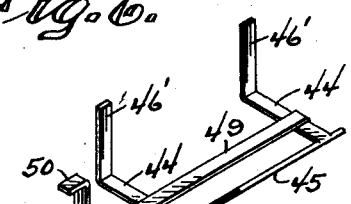
Frank E. Fowler
INVENTOR

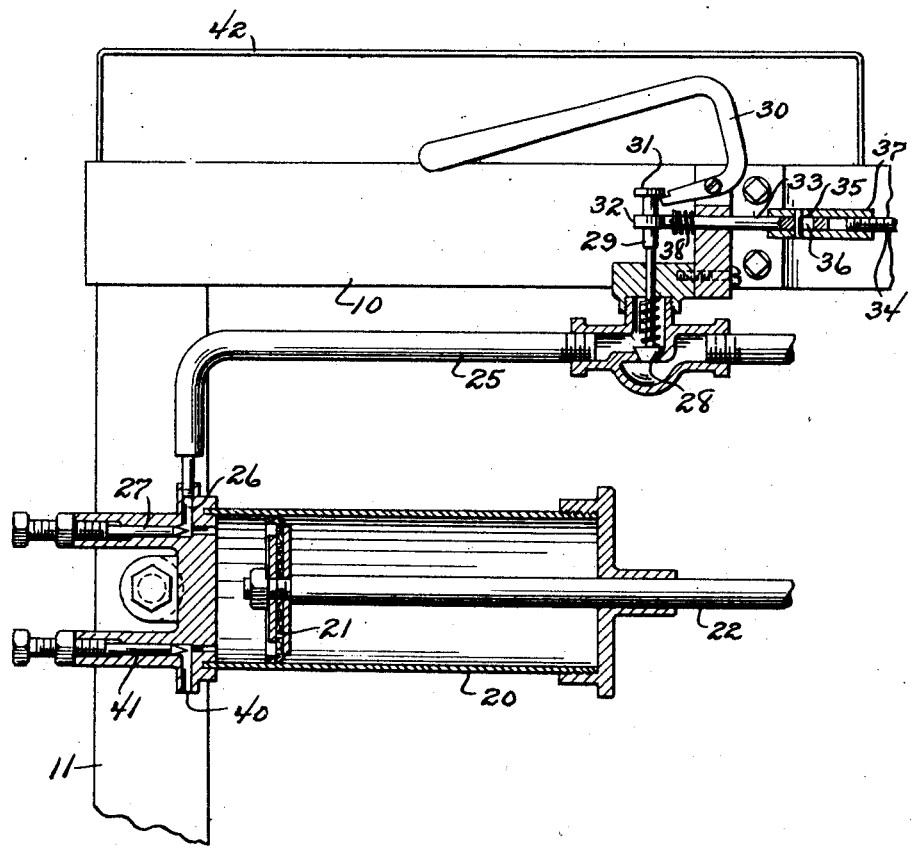

Patented Oct. 8, 1929

1,731,129

UNITED STATES PATENT OFFICE

FRANK E. FOWLER, OF ATHENS, GEORGIA

MIXING MACHINE

Application filed February 4, 1929. Serial No. 337,393.

This invention relates to mixing machines especially adapted for mixing bottled goods, such as soft drinks and the like, after the goods have been removed from the bottling machine.

Usually, the filled bottles, after their removal from the bottling machine, are inverted by hand, so that the syrup will be mixed with the carbonated or other water. This operation is very slow and unreliable, as the bottles are not always turned far enough, while the action is frequently too rapid to allow thorough mixing.

The present invention provides means for mixing the goods after they have been "cased", and for mixing an entire case at one operation, so that the operation is performed in an expeditious manner. In addition, the invention provides means for inverting the case through a rotary action and for imparting the same degree of rotation to each case, so that the contents of all of the bottles will be thoroughly mixed.

Another object of the invention is the provision of a machine especially adapted for handling cases of bottled goods in the manner above referred to, means being provided for conveniently placing the goods within the machine, inverting the same, and thereafter permitting a ready removal of the goods from the machine.

With the above and other objects in view, the invention further includes the following novel features and details of construction, to be hereinafter more fully described, illustrated in the accompanying drawings and pointed out in the appended claims.

In the drawings:—

Figure 3 is a side elevation looking at the side opposite that shown in Figure 1.

Figure 4 is a section on the line 4—4 of Figure 3.

Figure 5 is a fragmentary elevation showing the carrier in partly rotated position.

Figure 6 is a detail perspective view of the retaining frame.

Figure 7 is an enlarged fragmentary sectional view taken substantially on the line 7—7 of Figure 2.

Figure 1:
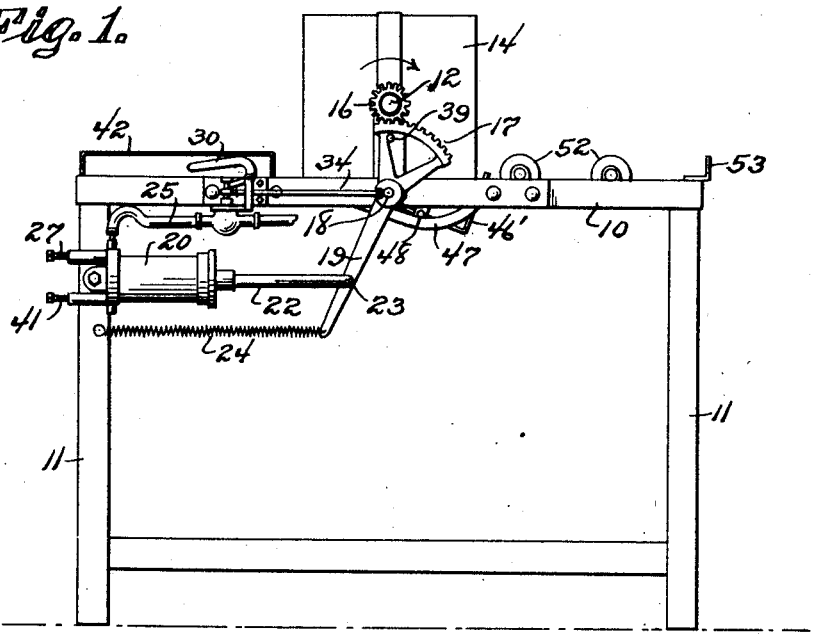
Figure 1 is a side view of a machine embodying the invention.
Figure 2:
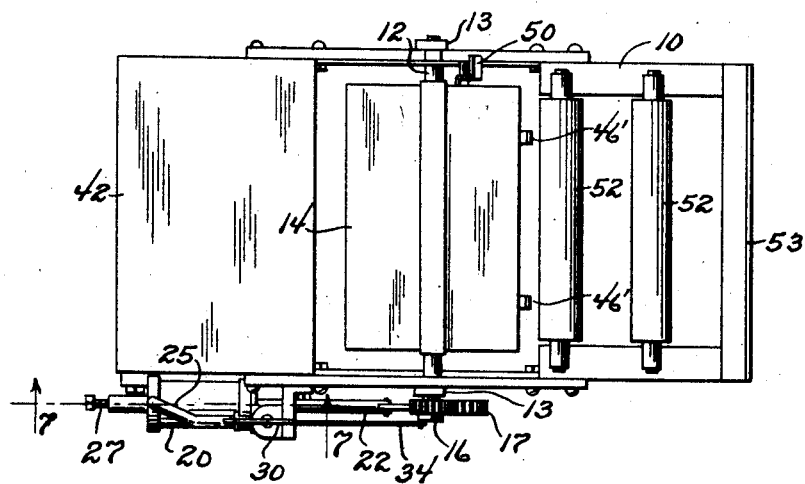
Figure 2 is a top plan view.

Referring to the drawings in detail wherein like characters of reference denote corresponding parts, the machine as shown comprises a horizontal frame 10 which is supported upon legs 11 and mounted in suitable bearings rising from the frame is a shaft 12. These bearings as illustrated comprise standards 13 which extend upwardly substantially central of the frame 10.

The shaft 12 has mounted thereon a carrier 14 of suitable construction, the carrier being shown as of box-like formation with its opposite sides open so as to permit of the insertion therein and removal therefrom of a case of bottled goods.

Mounted upon the shaft 12 is a pinion 16 which is engaged by a segmental gear 17. This gear is rotatably mounted upon a stub shaft 18 which extends from the frame 10 and is integral therewith and an arm or lever 19 is disposed radially of the gear 17.

Mounted upon one of the legs of the machine is a cylinder 20 and operating within this cylinder is a piston 21. A rod 22 which extends from this piston has its outer end pivotally connected with the lever 19 as shown at 23. A spring 24 which has one of its ends secured to the lever 19 and its other end secured to one of the legs 11 acts to yieldingly hold the piston 21 at the inner end of the cylinder 20.

The piston may be operated by compressed air, steam or other expansible agent introduced into the cylinder through a pipe 25 from any suitable source. One end of the pipe 25 communicates with an inlet port 26 which leads into the cylinder 20 and this port is controlled by a needle valve 27. The valve may be adjusted to regulate the rate of flow of the operating medium into the cylinder so that the speed of operation of the piston may be controlled. Located within the pipe 25 is a spring influenced valve 28 whose stem 29 extends upward and is engaged by one end of a pivotally mounted hand lever 30.

By reference to Figure 7 of the drawings it will be seen that by manually raising the lever 30 upward the valve 28 will be lifted from its seat so as to permit the passage of compressed air, steam, etc. into the cylinder 20.

The stem of the valve 20 is provided with spaced collars 31 and 32. The collar 31 is engaged by the inner end of the lever 30 so that when the lever is raised the valve will be unseated as just described. When the valve is moved upward, the collar 32 will be engaged by one end 33 of a rod 34 whose opposite end is secured to the lever 19 adjacent the shaft 18. The rod 34 is of sectional formation and its inner end or section 33 has a sliding connection with the main portion of the rod by means of a pin 35 which passes through a slot 36 provided in the end 33 of the rod, the pin 35 being carried by a sleeve 37. A spring 38 acts to force the section 33 of the rod toward the valve stem 29. Thus, when the valve stem 29 is moved upward by the operation of the lever 30, the end or section 33 of the rod 34 will move beneath the collar 33 so as to hold the valve 28 open. As the lever 19 moves pivotally through the outward travel of the piston 21 and reaches its limit of movement, the section 33 of the rod 34 will be withdrawn from beneath the collar 32 and the valve 28 will be seated under the action of its spring 38. Pivotal movement of the lever 19 in opposite directions is limited by a stop pin 39.

The cylinder 20 is provided with an exhaust port 40 which is controlled by a needle valve 41 as shown in Figure 7 of the drawings. By adjusting the valve 41 the speed of inward travel of the piston 21 under the action of the spring 24 may be controlled so that the valves 27 and 41 will control the speed of travel of the outward and inward movement respectively of the piston.

The bottled goods after being "cased" are placed upon a table 42 and from this table are slid into the carrier 14 whose bottom 43 is on the same horizontal plane as the top of the table 42. After the goods have been placed within the carrier 14 the lever 30 is operated so as to open the valve 28, whereupon the carrier 14 will move in the direction of the arrows shown in Figures 1 and 3 and after the carrier has reached its limit of rotary movement the valve 28 will be closed and the carrier returned to its normal position.

In order to retain the goods within the carrier during its rotary movement, the invention provides a retaining frame which is shown in detail in Figure 6 of the drawings. This frame comprises spaced parallel substantially L-shaped bars 44 whose inner ends are connected by a rod 45 and the opposite ends of this rod form pintles which are mounted in bearing lugs 46, depending from the bottom of the carrier 14. The outer angular ends of the bars 44 form arms 46 which are normally disposed below the bottom 43 of the carrier but are adapted to be extended upward above the bottom so as to be in the path of movement of the case of bottled goods when the bottom is inclined as illustrated in Figure 5 of the drawings.

This movement of the retaining frame or arms 46 is accomplished by means of a track 47 which is arranged to be engaged by a pin 48 extending from one end of a bar 49 which connects the bars 44 and extends beyond the end of the carrier 14. The bar 49 terminates in an upwardly and outwardly extending arm 50 which is adapted to engage an arcuate guide 51 rigid with one of the standards 13.

By reference to Figures 3 and 5 of the drawings it will be seen that as the carrier rotates in the direction of the arrow shown in Figure 3, the pin 48 will engage the track 47 and act to force the arms 46 upward at the outlet side of the carrier and in the path of sliding movement of the case of bottled goods when the carrier is inclined. Further movement of the carrier will cause the end of the arm 50 to engage the arcuate guide 51 so that the arms 46 will be held in the position shown in Figure 5 during the remaining rotary movement of the carrier or until it travels approximately one hundred and eighty degrees. The arm 50 remains in engagement with the guide 51 during the return movement of the carrier so that the arms 46 will remain in the position shown in Figure 5 until the carrier returns to its normal position. In this position the retaining frame and arms 46 will fall to the position shown in Figures 1 and 3 so that the case of goods may be slid outward over rollers 52 which are carried by the frame 10. A guard rail 53 is provided at the outer end of the frame.

The invention is susceptible of various changes in its form, proportions and minor details of construction and the right is herein reserved to make such changes as properly fall within the scope of the appended claims.

Having described the invention what is claimed is:—

1. A machine for mixing bottled goods comprising a rotatably mounted carrier open at opposite sides for the passage of a case of bottled goods therethrough, means to rotate the carrier first in one direction and then in another direction to invert the goods and return them to normally upright position, and means to retain the case of goods within the carrier during such rotary movement.

2. A machine for mixing bottled goods comprising a rotatably mounted carrier open at opposite sides for the passage of a case of bottled goods therethrough, means to rotate the carrier first in one direction and then in another direction to invert the goods and return them to normally upright position, and normally inactive means operable through rotation of the carrier to retain the case of goods within said carrier during such rotary movement.

3. A machine for mixing bottled goods comprising a rotatably mounted carrier open at opposite sides for the passage of a case of bottled goods therethrough, means to rotate the carrier first in one direction and then in another direction to invert the goods and return them to normally upright position, a frame pivotally secured to the carrier and disposed out of the path of the case of goods when the carrier is in normal position, and means engaged by the frame to move the latter into position to retain the case within the carrier when said carrier is rotated.

4. A machine for mixing bottled goods comprising a rotatably mounted carrier open at opposite sides for the passage of a case of bottled goods therethrough, means to rotate the carrier first in one direction and then in another direction to invert the goods and return them to normally upright position, a frame pivotally secured to the carrier and disposed out of the path of the case of goods when the carrier is in normal position, and means engaged by the frame when the carrier is rotated to move said carrier pivotally and retain the case within the carrier.

5. A machine for mixing bottled goods comprising a rotatably mounted carrier open at opposite sides for the passage of a case of bottled goods therethrough, means to rotate the carrier first in one direction and then in another direction to invert the goods and return them to normally upright position, a frame pivotally secured to the bottom of the carrier and including spaced substantially L-shaped arms disposed transversely of said carrier at one side thereof and normally positioned out of the path of the case of goods, an arm extending laterally at one end of the frame, and means located in the path of and engaged by the laterally extending arm when the carrier is rotated to move the frame pivotally and bring the L-shaped arms into position to retain the case within the carrier.

6. A mixing machine comprising a rotatably mounted carrier, a pivotally mounted spring influenced lever, means connecting the lever with the carrier to rotate the latter when the lever is moved pivotally, means to move the lever in one direction, manually operated means to control such movement, and means operable when the lever reaches a predetermined position to release the manually operated means and permit said lever to return to normal position.

7. A mixing machine comprising a rotatably mounted carrier, a pivotally mounted spring influenced lever, means connecting the lever with the carrier to rotate the latter when the lever is moved pivotally, means to move the lever in one direction, manually operated means to control such movement, means operable when the lever reaches a predetermined position to release the manually operated means and permit said lever to return to normal position, and means to regulate the speed of said lever in either direction.

8. A mixing machine comprising a rotatably mounted carrier, a pivotally mounted spring influenced lever, means connecting the lever with the carrier to rotate the latter when the lever is moved pivotally, means to move the lever in one direction, manually operated means to control such movement, and means to hold the manually operated means in active position to rotate the carrier in one direction and release such means to permit the return of the carrier to normal position.

In testimony whereof I affix my signature.

FRANK E. FOWLER.